C. R. KITTLE & J. W. GATES.
SPRING FORK FOR WHEELED VEHICLES.
APPLICATION FILED MAR. 28, 1910.
979,674.
Patented Dec. 27, 1910.
2 SHEETS—SHEET 1.
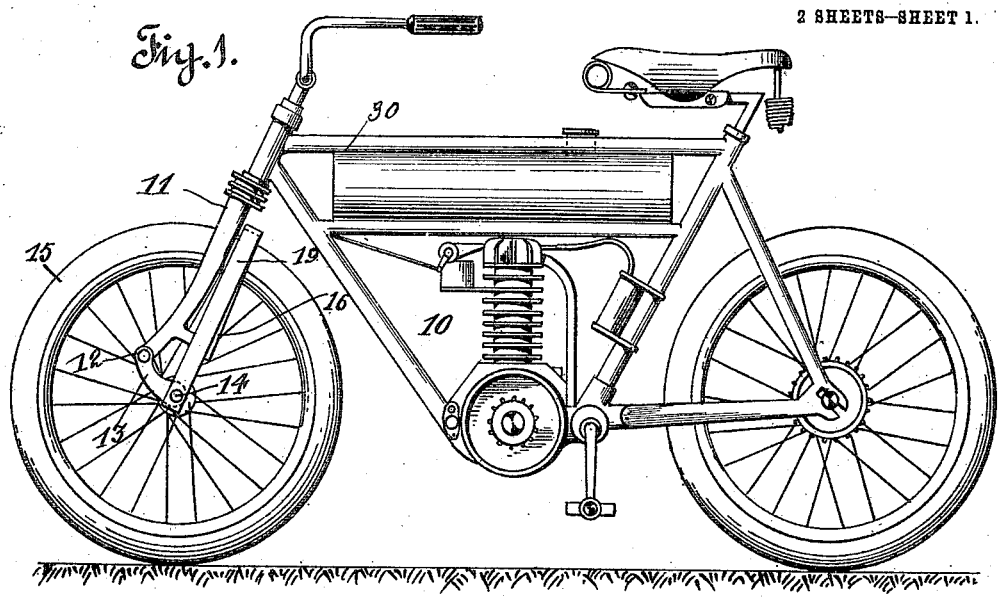
Fig. 1.
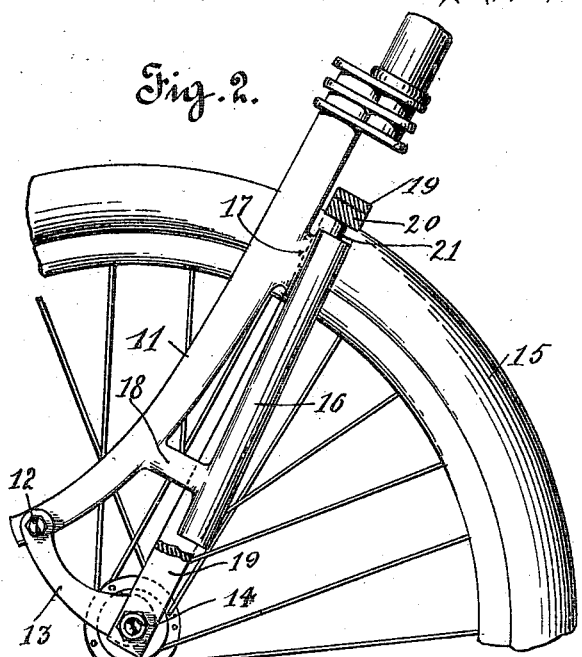
Fig. 2.
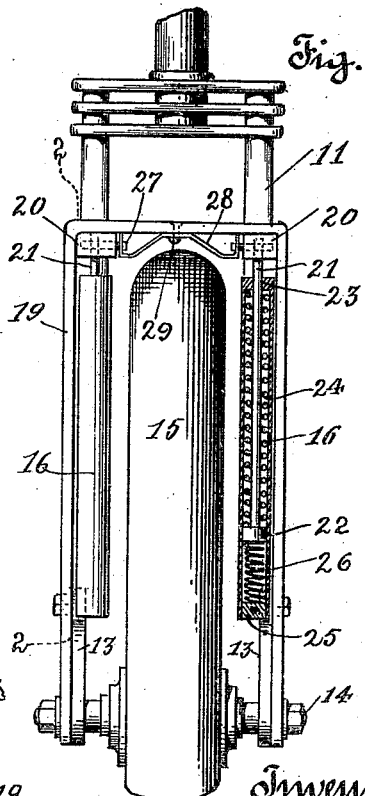
Fig. 3.
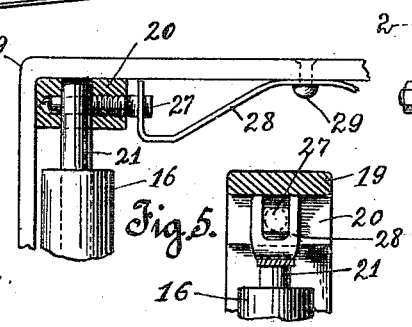
Fig. 4.
Fig. 5.
Witnesses.
Inventors
Charles R. Kittle,
John W. Gates,
By
Attorney.

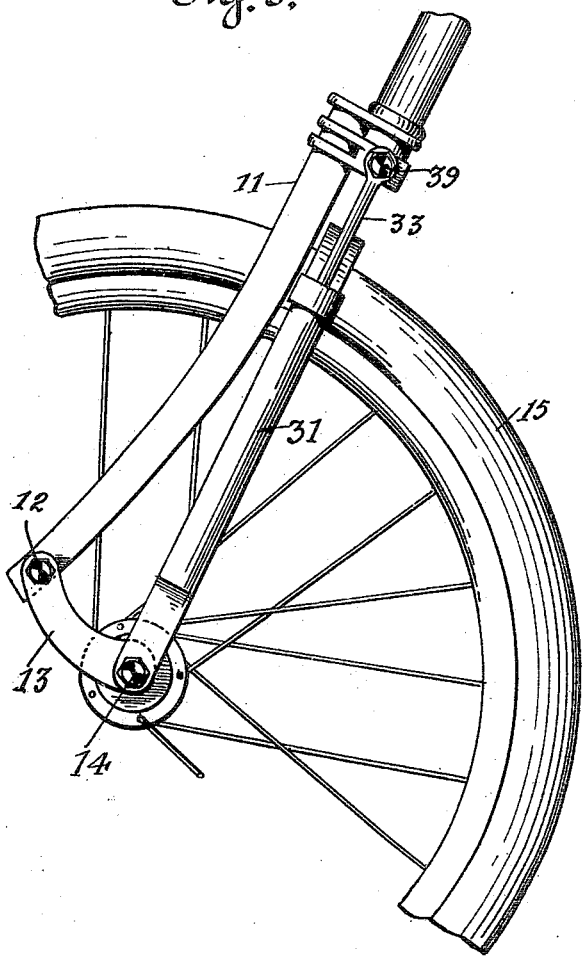
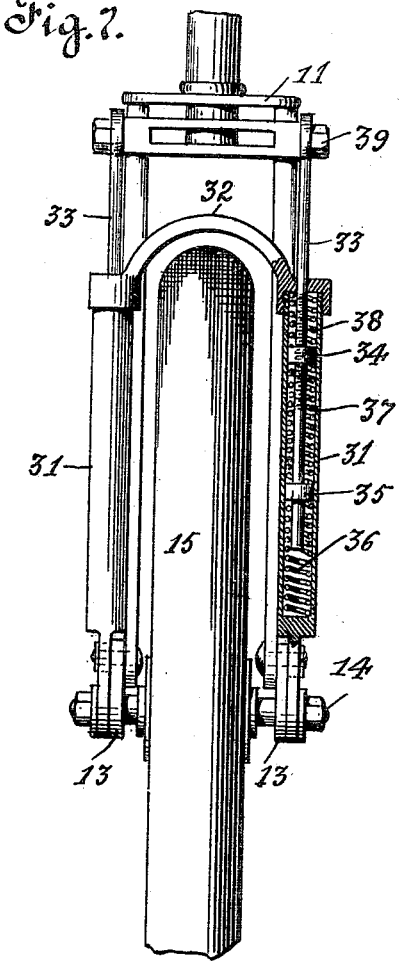

ously and rearwardly, turning on the pivotal connection on the front fork and the rocking bars without af

UNITED STATES PATENT OFFICE.

CHARLES R. KITTLE AND JOHN W. GATES, OF LOS ANGELES, CALIFORNIA; SAID GATES ASSIGNOR TO R. K. HOLMES, OF LOS ANGELES, CALIFORNIA.

SPRING-FORK FOR WHEELED VEHICLES.

979,674.  Specification of Letters Patent.  Patented Dec. 27, 1910.

Application filed March 28, 1910. Serial No. 551,929.

*To all whom it may concern:*

Be it known that we, CHARLES R. KITTLE, and JOHN W. GATES, both citizens of the United States, residing in the city of Los Angeles, county of Los Angeles, State of California, have invented new and useful Improvements in Spring-Forks for Wheeled Vehicles, of which the following is a specification.

Our invention relates to the front fork of such vehicles as motor cycles and bicycles. When the front wheel of a motor cycle or bicycle passes over an obstruction on the roadway, or into a depression therein the forward motion of the front wheel is somewhat retarded, and the wheel must rise to pass over the obstruction or out of the depression.

Our invention is designed to provide a front fork of such construction that the front wheel may rise as it passes over an obstruction on the roadway or into and out of a depression therein without the other portions of the frame rising, thereby causing the minimum amount of jar to the rider on the machine.

A further object is to provide a front fork of simple and compact construction which will be cheap to manufacture.

We accomplish these objects by the front fork described herein and illustrated in the accompanying drawings, in which:

Figure 1 is a side elevation of a motor cycle equipped with our improved front fork. Fig. 2 is a fragmental side elevation of a part of the front wheel and fork with a part cut away for clearness of illustration, the cut being on the line, 2—2 of Fig. 3. Fig. 3 is a rear view of the parts shown in Fig. 2 with other parts in central section and parts broken away. Figs. 4 and 5 are sectional details showing the manner of connecting certain of the parts to the fork. Figs. 6 and 7 illustrate a modified form.

In the drawings we have shown our improved front fork as applied to motor cycle 10 and will describe it as applied to such a machine. The front fork 11 of the motor cycle is of any of the approved makes. The lower ends of the legs of the front fork are pivotally connected at 12 to rocking bars 13 which are pivotally mounted at their other ends upon axle 14 which carries the front wheel 15. To the legs of the front fork are secured spring barrels 16 by means of braces 17 and 18 which are preferably of unequal length, the lower brace being longer than the upper one, in order to cause the lower end of the legs of the fork to project in front of a vertical plane that passes through the axle of the wheel. A U-shaped frame or yoke 19 is mounted upon the axle of the front wheel and is a little broader than the width of the legs of the fork, as best shown in Fig. 3. In the upper corners of the yoke, and rigidly secured thereto by brazing or welding are metallic carrying blocks 20 which are vertically bored for the reception of the upper end of plunger stems 21, as best shown in Fig. 4. Upon the lower end of each plunger stem 21 is plunger 22 which has a working fit in the spring barrels. The upper ends of the spring barrels are closed by plugs 23 having central apertures through which the plunger stems pass. Coiled around the plunger stems between the plungers and the plugs are coil springs 24. The lower ends of the spring barrels are closed by plugs 25 and between these plugs and the plungers are the recoil springs 26. Plunger stems 21 are mounted in the carrying blocks by means of pins or bolts 27 whose outer ends are screw threaded and pass through the carrying blocks and as to one side thereof are in threaded contact therewith as best shown in Fig. 4. These pins are smooth where they pass through the plunger stems. The extreme outer end of these pins is square as best shown in Fig. 5 and after they are secured in place they are held from accidental rotation by a spring 28 which is secured to the yoke 19 by rivet 29. This spring has its outer ends turned upwardly to lie in a plane at right angles to the top of the yoke and the ends are bifurcated so as to snap over pins 27 and hold them against rotation as shown in Figs. 3, 4, and 5.

In the operation of a vehicle equipped with our front fork, when an obstruction, or a depression is passed over, as the front wheel passes over, or into and out of the same, it passes upwardly and rearwardly, turning on the pivotal connection on the front fork and the rocking bars without affecting to any great extent the front end of the frame, as the springs 24 yield to allow of the uprise of the wheel without affecting the elevation of the frame. The recoil springs 26 neutralize the reaction or recoil of springs 24. It will be observed that our improvement can be applied to the front fork of any standard machine without changing the construction of the same, as the spring barrels can be suitably attached thereto and the rocking bar will connect the regular front fork to the axle and the yoke frame can be mounted thereon in the same manner that the front fork is now mounted. It will also be observed that the rocking bars are a part of the front member making the same a jointed front member which is mounted on the axle of the front wheel. The front member 11 is the steering member and is revolubly mounted in the front part of the frame 30.

In Figs. 6 and 7 we have illustrated a modification of our improvement. In this modified form spring barrels 31 form a part of the U-shaped member 32, which member is secured upon the front axle 14, and corresponds to member 19. Plunger stems 33 project through the upper end of the spring barrels and are provided with plungers 34 which are adjustable upon the plunger stems. On these plunger stems are also mounted loose plungers 35 which serve as a guide to the lower end of the plunger stems. Below the guide plunger and surrounding the lower end of the plunger stem is a coiled spring 36, and between the guide plunger 35 and adjustable plunger 34 is another coil spring 37. These two springs constitute compression springs and sustain the normal weight of the frame. Above the adjustable plungers 34 is a rebound spring 38. The plunger stems 33 are pivotally secured upon the front fork 11 by bolt 39. The lower ends of the legs of the front fork are connected to the front axle by rocking bars 13. The operation of the parts is the same as in the other construction.

Having described our invention what we claim is:

1. An improved front fork for a wheeled vehicle comprising an U-shaped frame mounted upon the axle of the front wheel and extending upwardly and over the wheel; a bifurcated front member; rocking bars mounted upon the axle of the front wheel and pivotally connected to the lower ends of the bifurcated member; spring barrels connected to the legs of the bifurcated member at the rear thereof; plungers within said spring barrels, said plungers having stems extending upwardly to and pivotally connected with the U-shaped frame; coiled springs within said barrels around said plunger stems; removable closures for the lower ends of said spring barrels; and coiled springs between said closures and said plungers.

2. An improved fork for a wheeled vehicle comprising a bifurcated front member operatively mounted in the frame of the vehicle and upon the axle of the wheel, the legs of said front member being jointed, an U-shaped member mounted upon the axle of the wheel and extending over said wheel and being located behind the front member, and a resilient connection between said members.

3. In a wheeled vehicle, a frame; a steering post member revolubly mounted in the forward part of said frame, said steering post member comprising a bifurcated front member, the legs of which are jointed, and mounted upon the axle of the front wheel, and an U-shaped member at the rear of the front member mounted upon the axle of the front wheel and extending over said wheel, and a resilient connection between said bifurcated and U-shaped members.

In witness that we claim the foregoing we have hereunto subscribed our names this 2nd day of March, 1910.

CHARLES R. KITTLE.
JOHN W. GATES.

Witnesses:
G. E. HARPHAM,
S. B. AUSTIN.